(12) United States Patent
Jin et al.

(10) Patent No.: US 12,601,322 B2
(45) Date of Patent: Apr. 14, 2026

(54) WIND TURBINE FLUTTER SUPPRESSION METHOD AND DEVICE, CONTROL SYSTEM AND WIND TURBINE

(71) Applicant: Envision Energy Co., Ltd., Jiangsu (CN)

(72) Inventors: Mengren Jin, Jiangsu (CN); Dongdong Liu, Jiangsu (CN); Pu Zhang, Jiangsu (CN); Bin Xu, Jiangsu (CN)

(73) Assignee: Envision Energy Co., Ltd., Jiangsu (CN)

( * ) Notice: Subject to any disclaimer, the term of this patent is extended or adjusted under 35 U.S.C. 154(b) by 0 days.

(21) Appl. No.: 19/221,547

(22) Filed: May 29, 2025

(65) Prior Publication Data

US 2025/0290486 A1 Sep. 18, 2025

Related U.S. Application Data

(63) Continuation of application No. PCT/CN2024/126428, filed on Oct. 22, 2024.

(30) Foreign Application Priority Data

Dec. 13, 2023 (CN) .......................... 202311713357.X

(51) Int. Cl.
*F03D 7/02* (2006.01)

(52) U.S. Cl.
CPC ......... *F03D 7/0298* (2023.08); *F03D 7/0224* (2013.01); *F05B 2260/96* (2013.01);
(Continued)

(58) Field of Classification Search
CPC .............................. F03D 7/0298; F03D 7/0224
See application file for complete search history.

(56) References Cited

U.S. PATENT DOCUMENTS 8,360,724 B2 * 1/2013 Yoshida ................ F03D 7/0268
416/41
2008/0304964 A1 12/2008 Yoshida
(Continued)

FOREIGN PATENT DOCUMENTS

CN 102032110 A 4/2011
CN 111561421 A 8/2020
(Continued)

OTHER PUBLICATIONS

Envision Energy Co., Ltd., International Search Report with English Translation, PCT/CN2024/126428, Feb. 5, 2025, 6 pgs.
(Continued)

*Primary Examiner* — Sabbir Hasan
(74) *Attorney, Agent, or Firm* — USCH Law, PC

(57) ABSTRACT

A wind turbine flutter suppression method includes: determining a nacelle-wind direction angle between a wind direction and a nacelle direction; and determining a pitching method for changing pitch angles according to the nacelle-wind direction angle. The pitching method includes a speed-controlled pitching scheme and a pitch-angle-sequence-controlled pitching scheme. The speed-controlled pitching scheme includes regulating pitch angles of blades of the wind turbine according to a rotor speed of the wind turbine to keep the rotor speed within a preset speed range until flutter of the wind turbine is suppressed. The pitch-angle-sequence-controlled pitching scheme includes performing a pitching operation on the pitch angles of the blades of the wind turbine according to preset pitching rules until the flutter of the wind turbine is suppressed.

14 Claims, 4 Drawing Sheets

(52) U.S. Cl.
CPC ... *F05B 2270/321* (2013.01); *F05B 2270/327* (2013.01); *F05B 2270/328* (2013.01)

(56) References Cited

U.S. PATENT DOCUMENTS

| | | | |
|---|---|---|---|
| 2012/0146331 A1 | 6/2012 | Egedal et al. | |
| 2020/0263665 A1* | 8/2020 | Dharmadhikari | F03D 7/0204 |
| 2022/0299007 A1 | 9/2022 | Namura et al. | |

FOREIGN PATENT DOCUMENTS

| | | | |
|---|---|---|---|
| CN | 111706465 A | 9/2020 | |
| CN | 114294154 A | 4/2022 | |
| CN | 114729622 A | 7/2022 | |
| CN | 116971921 A | 10/2023 | |
| CN | 220101437 U | 11/2023 | |
| CN | 117514612 A | 2/2024 | |
| EP | 2003335 A2 | 12/2008 | |
| EP | 2306005 A2 | 4/2011 | |

OTHER PUBLICATIONS

Envision Energy Co., Ltd., The Extended European Search Report, EP 24837831.7, Dec. 19, 2025, 7 pgs.
Envision Energy Co., Ltd., The Australian First Examination Report, AU2024378987, Feb. 26, 2026, 5 pgs.

* cited by examiner

N

Rotating axis
of rotor

2 b

4

Wind direction

1

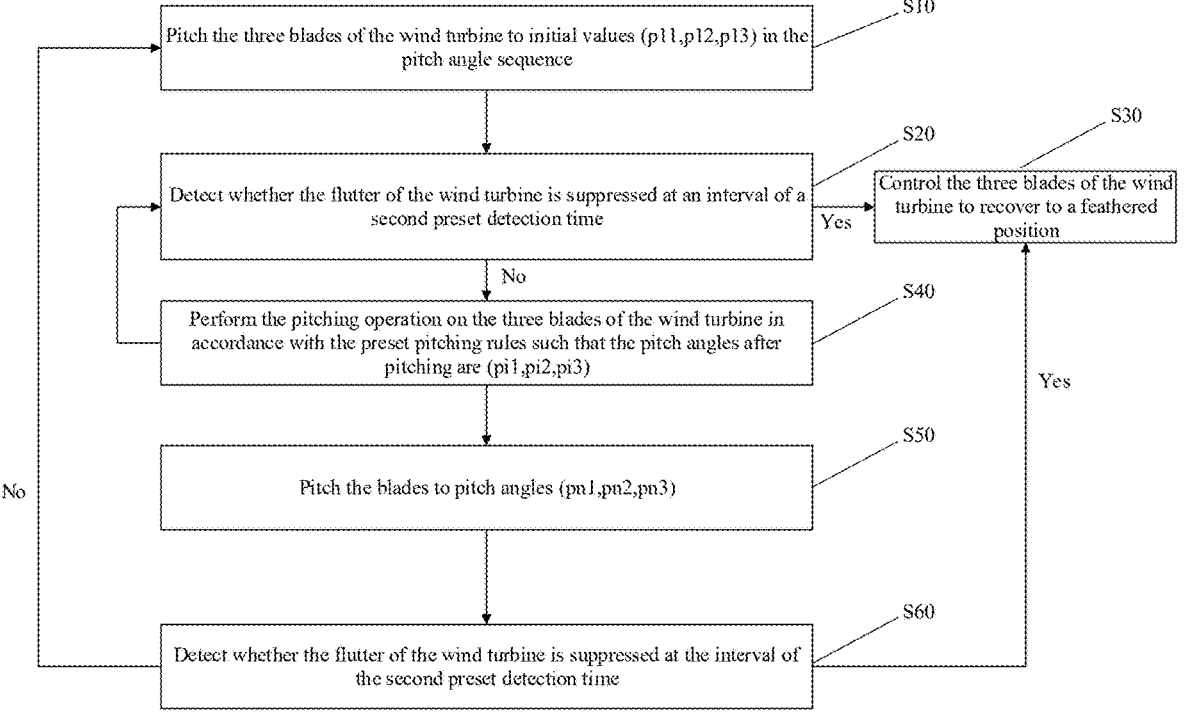

S10

Pitch the three blades of the wind turbine to initial values (p11,p12,p13) in the pitch angle sequence

S20                    S30

Detect whether the flutter of the wind turbine is suppressed at an interval of a second preset detection time Control the three blades of the wind turbine to recover to a feathered position Yes No

S40

Perform the pitching operation on the three blades of the wind turbine in accordance with the preset pitching rules such that the pitch angles after pitching are (pi1,pi2,pi3)

S50

Pitch the blades to pitch angles (pn1,pn2,pn3)

Yes

No

S60

Detect whether the flutter of the wind turbine is suppressed at the interval of the second preset detection time

FIG. 6

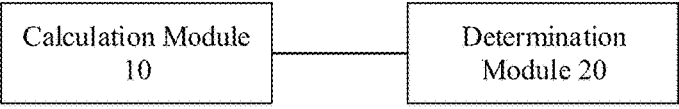

Calculation Module 10

Determination Module 20

FIG. 7

WIND TURBINE FLUTTER SUPPRESSION METHOD AND DEVICE, CONTROL SYSTEM AND WIND TURBINE

CROSS REFERENCE TO RELATED APPLICATIONS

The present application is a continuation of PCT Patent Application No. PCT/CN2024/126428, entitled "WIND TURBINE FLUTTER SUPPRESSION METHOD AND DEVICE, CONTROL SYSTEM AND WIND TURBINE," filed on Oct. 22, 2024, which claims priority to Chinese patent application No. 202311713357.X, entitled "WIND TURBINE FLUTTER SUPPRESSION METHOD AND DEVICE, CONTROL SYSTEM AND WIND TURBINE," filed on Dec. 13, 2023, each of which is incorporated by reference herein in its entirety.

FIELD OF TECHNOLOGY

The present disclosure relates to the technical field of wind turbines, and in particular to a wind turbine flutter suppression method and device, a control system and a wind turbine.

BACKGROUND

For large wind turbines, with the increase of impeller diameter and tower height, the possibility of flutter of wind turbine blades in a static state gradually increases. In the prior art, the flutter suppression of wind turbines is usually realized by changing the nacelle-wind direction angle (i.e., yawing) in combination with changing the pitch angle. Usually, the controller of the wind turbine can change the nacelle direction by driving a yaw motor installed in the nacelle so as to change the nacelle-wind direction angle, and change the installation angle of the blades relative to the hub through the action of the pitch motor in the hub so as to change the pitch angle. As we all know, the action of the yaw motor consumes a lot of energy, and the action of the pitch motor consumes a little energy. However, when the power grid fails, the wind turbine can sometimes only be equipped with a small diesel generator for power supply, and the output power is not enough to support the yawing and pitching actions at the same time, so the flutter of the wind turbine cannot be effectively suppressed.

SUMMARY

In view of this, embodiments of the present disclosure provide a wind turbine flutter suppression method and device, a control system and a wind turbine, which can realize flutter suppression of the wind turbine without yawing.

In a first aspect, an embodiment of the present disclosure provides a wind turbine flutter suppression method, including:

determining a nacelle-wind direction angle between a nacelle direction of a wind turbine and a wind direction; and selecting a pitching policy for changing pitch angles according to the nacelle-wind direction angle; where the pitching policy is selected from a plurality of pitching policies including a speed-controlled pitching scheme and a pitch-angle-sequence-controlled pitching scheme;

the speed-controlled pitching scheme includes regulating pitch angles of blades of the wind turbine according to a rotor speed of the wind turbine to keep the rotor speed within a preset speed range until flutter of the wind turbine is suppressed; and the pitch-angle-sequence-controlled pitching scheme includes performing a pitching operation on the blades of the wind turbine according to a pitch angle sequence in preset pitching rules until the flutter of the wind turbine is suppressed.

In some embodiments, the selecting the pitching policy for changing the pitch angles according to the nacelle-wind direction angle includes:

using the speed-controlled pitching scheme to regulate the pitch angles when the nacelle-wind direction angle is less than a first angle or the nacelle-wind direction angle is greater than or equal to a second angle; and using the pitch-angle-sequence-controlled pitching scheme to regulate the pitch angles when the nacelle-wind direction angle is greater than or equal to the first angle and less than the second angle;

where the first angle is in a range of greater than or equal to 40 degrees and less than or equal to 70 degrees; and the second angle is in a range of greater than or equal to 110 degrees and less than or equal to 140 degrees.

In some embodiments, the regulating the pitch angles of the blades of the wind turbine according to the rotor speed of the wind turbine to keep the rotor speed within the preset speed range includes:

detecting, each time after regulating the pitch angles of the three blades of the wind turbine, whether the rotor speed is within the preset speed range at an interval of a first preset detection time;

where the preset speed range is between a first speed and a second speed;

reducing, if detecting that the rotor speed is less than the first speed, the pitch angles of the three blades of the wind turbine by a preset regulation angle respectively; and increasing, if detecting that the rotor speed is greater than the second speed, the pitch angles of the three blades of the wind turbine by the preset regulation angle respectively;

where a relationship between the first speed and the second speed satisfies 0<first speed<second speed<12 rpm.

In some embodiments, the performing the pitching operation on the blades of the wind turbine according to the pitch angle sequence in the preset pitching rules includes:

pitching the three blades of the wind turbine to first sequence values in the pitch angle sequence;

detecting whether the flutter of the wind turbine is suppressed at an interval of a second preset detection time;

in response to the flutter of the wind turbine being not suppressed at the interval of the second preset detection time, performing the pitching operation on the three blades of the wind turbine in accordance with the preset pitching rules such that the pitch angles reach second sequence values in the pitch angle sequence;

detecting, after the pitching operation, whether the flutter of the wind turbine is suppressed again at the interval of the second preset detection time; and in response to, after the pitching operation, the flutter of the wind turbine being not suppressed at the interval of the second preset detection time, continuing performing the pitching operation on the three blades of the wind turbine in accordance with the preset pitching rules such that the pitch angles reach next sequence values in the pitch angle sequence;

where the preset pitching rules include:

the pitch angles of the three blades in the pitch angle sequence respectively increase or decrease in sequence;

a difference between a maximum pitch angle and a minimum pitch angle of the same blade in the pitch angle sequence is greater than a maximum flutter-accumulating pitch angle interval span; and an absolute value of a difference between the adjacent sequence values of the pitch angles of the same blade in the pitch angle sequence is less than a minimum distance between flutter-accumulating pitch angle intervals.

In some embodiments, the maximum flutter-accumulating pitch angle interval span is greater than 60 degrees; and the minimum distance between flutter-accumulating pitch angle intervals is less than 35 degrees.

In some embodiments, the determining whether the flutter of the wind turbine is suppressed includes:

collecting a vibration signal of a tower vibration sensor or a blade vibration sensor on the wind turbine;

performing spectrum analysis on the vibration signal, and extracting an amplitude-frequency component of the vibration signal in a band of 0.2 Hz to 3.0 Hz as an equivalent amplitude; and determining, if the equivalent amplitude is not greater than a preset value, that the flutter of the wind turbine is suppressed, where the preset value is in a range of 0.004 m/s^2<preset value<0.1 m/s^2.

In some embodiments, after the flutter of the wind turbine is suppressed, the method further includes controlling the three blades of the wind turbine to recover to a feathered position;

where the feathered position refers to a position where the pitch angles are greater than or equal to 80 degrees and less than or equal to 95 degrees.

In a second aspect, an embodiment of the present disclosure provides a wind turbine flutter suppression device, including:

a calculation module, configured to determine a nacelle-wind direction angle between a nacelle direction of a wind turbine and a wind direction; and a determination module, configured to determine a pitching policy for changing pitch angles according to the nacelle-wind direction angle;

where the pitching policy is selected from a plurality of pitching policies including a speed-controlled pitching scheme and a pitch-angle-sequence-controlled pitching scheme;

the speed-controlled pitching scheme includes regulating pitch angles of blades of the wind turbine according to a rotor speed of the wind turbine to keep the rotor speed within a preset speed range until flutter of the wind turbine is suppressed; and the pitch-angle-sequence-controlled pitching scheme includes performing a pitching operation on the blades of the wind turbine according to a pitch angle sequence in preset pitching rules until the flutter of the wind turbine is suppressed.

In a third aspect, an embodiment of the present disclosure provides a control system for a wind turbine, including a controller and a pitch drive system.

The pitch drive system is configured to receive an instruction of the controller and pitch blades of the wind turbine; and the controller is configured to perform a wind turbine flutter suppression method as described above and output a control instruction to the pitch drive system.

In a fourth aspect, an embodiment of the present disclosure provides a wind turbine, including a control system for a wind turbine as described above.

The embodiments of the present disclosure have the following beneficial effects: According to the present disclosure, first, the nacelle-wind direction angle between the wind direction and the nacelle direction is determined; and then whether the pitching operation is performed by using the speed-controlled pitching scheme or the pitch-angle-sequence-controlled pitching scheme according to the nacelle-wind direction angle. With this method, the flutter suppression of the wind turbine can be realized without yawing by using the low-power standby power supply when the wind turbine is powered down.

BRIEF DESCRIPTION OF THE DRAWINGS

In order to more clearly illustrate the technical solutions of the embodiments of the present disclosure, the accompanying drawings used in the embodiments of the present disclosure will be briefly described below. It should be understood that the following accompanying drawings show only certain embodiments of the present disclosure, and therefore, should not be considered as limiting the scope. Those of ordinary skill in the art can obtain other related drawings according to these drawings without any creative work.

FIG. 6 shows a second flowchart of the wind turbine flutter suppression method according to an embodiment of the present disclosure; and FIG. 7 shows a schematic structural diagram of a wind turbine flutter suppression device according to an embodiment of the present disclosure.

DESCRIPTION OF REFERENCE SIGNS

Figures 1, 2:
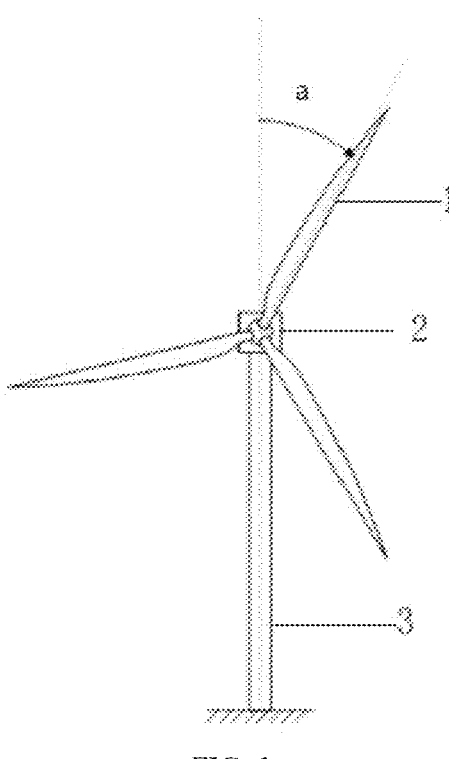
FIG. 1 shows a schematic structural view of a wind turbine according to an embodiment of the present disclosure.
FIG. 2 shows a schematic diagram of a nacelle-wind direction angle according to an embodiment of the present disclosure.

1—blade; 2—nacelle; 3—tower; 4—hub; 10—calculation module; 20—determination module;

a—blade azimuth; b—nacelle—wind direction angle; c—pitch angle; d flutter-accumulating interval; e—interval span; f—distance between intervals.

DESCRIPTION OF THE EMBODIMENTS

The technical solutions in embodiments of the present disclosure will be clearly and completely described in the following with reference to the accompanying drawings in the embodiments of the present disclosure. Apparently, the described embodiments are merely some rather than all of the embodiments of the present disclosure.

The components of the embodiments of the present disclosure, which are generally described and illustrated in the accompanying drawings herein, may be arranged and designed in a variety of different configurations. Therefore, the detailed description of the embodiments of the present disclosure in the accompanying drawings is not intended to limit the protection scope of the present disclosure, but merely represents the selected embodiments of the present disclosure. All other embodiments obtained by those of ordinary skill in the art based on the embodiments provided in the present disclosure without creative work shall fall within the protection scope of the present disclosure.

Hereinafter, the terms "including", "having" and cognates thereof, which can be used in various embodiments of the present disclosure, are merely intended to indicate specific features, numbers, steps, operations, elements, components or combinations of the foregoing items, and should not be understood as first excluding the presence of one or more other features, numbers, steps, operations, elements, components or combinations of the foregoing items or the possibility of adding one or more other features, numbers, steps, operations, elements, components or combinations of the foregoing items. In addition, the terms "first", "second", "third" and the like are only used for descriptive purposes, and cannot be understood as indicating or implying relative importance.

Unless otherwise defined, all terms (including technical terms and scientific terms) used herein have the same meaning as commonly understood by those of ordinary skill in the art to which the embodiments of the present disclosure belong. The terms (such as those defined in dictionaries of general use) will be interpreted as having the same meaning as the contextual meaning in the related art and will not be interpreted as having an idealized meaning or an overly formal meaning unless clearly defined in the embodiments of the present disclosure.

Some implementations of the present disclosure will be described in detail below with reference to the accompanying drawings. In the case of no conflict, the following embodiments and the features in the embodiments may be combined with each other.

For large wind turbines, with the increase of impeller diameter and tower height, the possibility of vibrations of wind turbine blades in a static state gradually increases.

Figure 3:
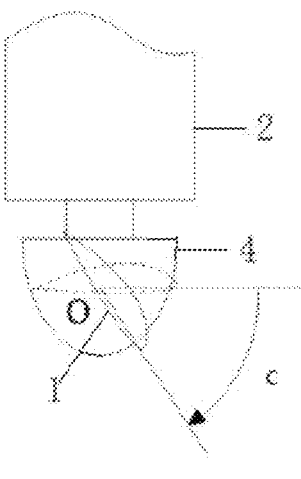
FIG. 3 shows a schematic diagram of a pitch angle according to an embodiment of the present disclosure.

As shown in FIG. 1 to FIG. 3, a wind turbine typically includes, but not limited to, a tower, a nacelle, a hub and blades. The hub 4 and the blades 1 are combined to form a rotor. The nacelle 2 is installed on the tower 3, the hub 4 is installed at a front end of the nacelle 2, and the three blades 1 are installed symmetrically along a side wall surface of the hub 4. An angle between a central axis of the nacelle 2 and a wind direction is called a nacelle-wind direction angle for short. An installation angle of the blade 1 relative to the hub 4 is dynamically adjustable, which is called a pitch angle, as shown by c in FIG. 3. Under the action of wind power, the rotor rotates around the central axis of the nacelle 2, and an angle between the blade 1 and the tower 3 is called a blade azimuth, which is shown by a in FIG. 1.

In the prior art, the flutter suppression of wind turbines is usually realized by changing the nacelle-wind direction angle (i.e., yawing) in combination with changing the pitch angle. Usually, the controller of the wind turbine can change the nacelle 2 direction by driving a yaw motor installed in the nacelle 2 so as to change the nacelle-wind direction angle, and change the installation angle of the blades relative to the hub 4 through the action of the pitch motor in the hub 4 so as to change the pitch angle. As we all know, the action of the yaw motor consumes a lot of energy, and the action of the pitch motor consumes a little energy. However, when the power grid fails, the wind turbine can sometimes only be equipped with a small diesel generator for power supply, and the output power is not enough to support the yawing and pitching actions at the same time, so the flutter of the wind turbine cannot be effectively suppressed.

The present disclosure provides a method that can realize flutter suppression of the wind turbine without yawing only by changing the pitch angle.

The wind turbine flutter suppression method will be described in detail below with reference to some specific embodiments.

Figure 4:
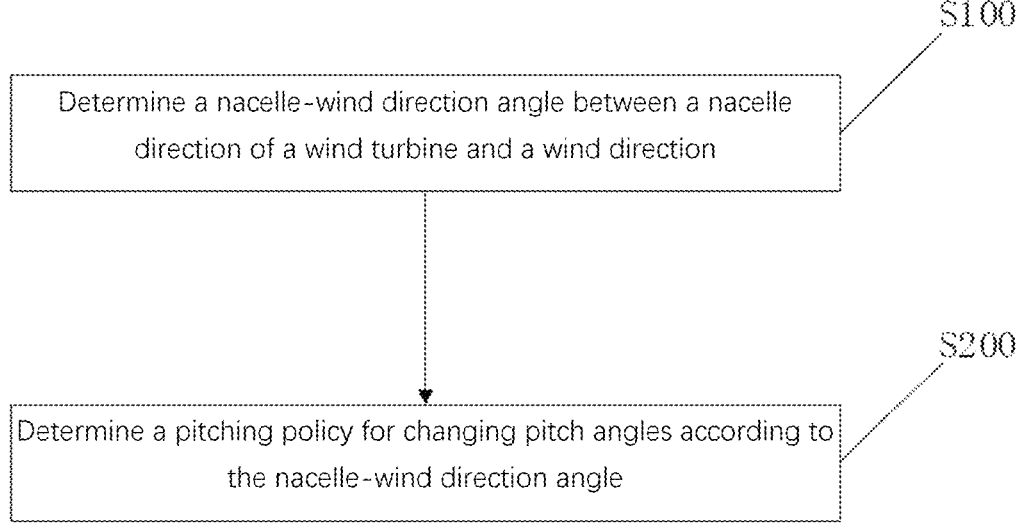
FIG. 4 shows a first flowchart of a wind turbine flutter suppression method according to an embodiment of the present disclosure.

FIG. 4 shows a flowchart of the wind turbine flutter suppression method according to an embodiment of the present disclosure. Exemplarily, the wind turbine flutter suppression method includes steps as follows:

Step S100: Determine a nacelle-wind direction angle between a nacelle direction of a wind turbine and a wind direction.

As shown in FIG. 2, the nacelle-wind direction angle b is specifically an angle between the central axis of the nacelle and the wind direction. The nacelle-wind direction angle can be measured by a wind vane installed at the top of the nacelle or an anemometer tower several kilometers in front of the wind turbine. The wind vane or the anemometer tower can sense the angle between the incident airflow and the central axis of the sensor, and then convert it into an electrical signal, which is sent to the controller of the wind generator, so as to determine the nacelle-wind direction angle.

Step S200: Determine a pitching policy for changing pitch angles according to the nacelle-wind direction angle.

The pitching policy is selected from a plurality of pitching policies including a speed-controlled pitching scheme and a pitch-angle-sequence-controlled pitching scheme.

The speed-controlled pitching scheme includes regulating pitch angles of blades of the wind turbine according to a rotor speed of the wind turbine to keep the rotor speed within a preset speed range until flutter of the wind turbine is suppressed.

The pitch-angle-sequence-controlled pitching scheme includes: performing a pitching operation on the blades of the wind turbine according to a pitch angle sequence in preset pitching rules until the flutter of the wind turbine is suppressed.

Generally, for wind turbines, the nacelle-wind direction angle and the pitch angle are important factors that influence wind energy capture. The nacelle-wind direction angle is in a range of [0, 180]. When the nacelle-wind direction angle is close to 90 degrees, no matter what angle is used, the wind turbine cannot capture wind energy. When the nacelle-wind direction angle is close to 0 degrees or 180 degrees, the wind energy can be captured by properly regulating the pitch angle to make the rotor rotate. The smaller the pitch angle, the larger the captured wind energy, and the higher the stable speed of the rotor. Conversely, the larger the pitch angle, the smaller the captured wind energy. When the rotor rotates, the blade azimuth changes constantly, and there is no condition for the flutter accumulation of the blade. Therefore, when the nacelle-wind direction angle is close to 0 degrees or 180 degrees, the blade flutter can be suppressed by making the rotor rotate, i.e., the flutter can be suppressed by using the speed-controlled pitching scheme. Further, when the nacelle-wind direction angle is close to 90 degrees, the pitch action is not enough to make the rotor rotate. In this case, the flutter can be suppressed by using a specific pitch-anglesequence-controlled method, i.e., by using the pitch-angle-sequence-controlled pitching scheme.

Further, according to the influence of the nacelle-wind direction angle and the pitch angle on wind energy capture, the determining the pitching method for changing the pitch angles according to the nacelle-wind direction angle in the present disclosure includes:

using the speed-controlled pitching scheme to regulate the pitch angles when the nacelle-wind direction angle is less than a first angle or the nacelle-wind direction angle is greater than or equal to a second angle; and using the pitch-angle-sequence-controlled pitching scheme to regulate the pitch angles when the nacelle-wind direction angle is greater than or equal to the first angle and less than the second angle.

The first angle is in a range of greater than or equal to 40 degrees and less than or equal to 70 degrees; and the second angle is in a range of greater than or equal to 110 degrees and less than or equal to 140 degrees.

Specifically, in the present disclosure, when the nacelle-wind direction angle is greater than 0 degrees and less than the first angle, the wind turbine is in a state of facing the wind; when the nacelle-wind direction angle is greater than or equal to the second angle, the wind turbine is in a state of facing away from the wind; and when the nacelle-wind direction angle is greater than or equal to the first angle and less than the second angle, the wind turbine is in a state of laterally facing the wind. The first angle and the second angle are selected such that the rotor can rotate effectively when the wind turbine faces or faces away from the wind and the rotor can hardly rotate when the wind turbine laterally faces the wind. In the present disclosure, wind turbine load simulation software (such as Bladed) is used for calculation, the first angle is in a range of [40, 70], and the second angle is in a range of [110, 140], such that the requirements for the speed of the wind turbine in the three states above can be satisfied at the same time.

It can be understood that in the present disclosure, when the wind turbine faces or faces away from the wind turbine, the pitch angles can be changed by using the speed-controlled pitching scheme, and when the wind turbine laterally faces the wind, the pitch angles can be changed by using the pitch-angle-sequence-controlled pitching scheme.

In some implementations, the regulating the pitch angles of the blades of the wind turbine according to the rotor speed of the wind turbine to keep the rotor speed within the preset speed range includes:

detecting, each time after regulating the pitch angles of the three blades of the wind turbine, whether the rotor speed is within the preset speed range at an interval of a first preset detection time; where the preset speed range is between a first speed and a second speed;

reducing, if detecting that the rotor speed is less than the first speed, the pitch angles of the three blades of the wind turbine by a preset regulation angle respectively; and increasing, if detecting that the rotor speed is greater than the second speed, the pitch angles of the three blades of the wind turbine by the preset regulation angle respectively.

As long as the rotor rotates, the condition for flutter accumulation can be destroyed, so the first speed only needs to be greater than 0 in the present disclosure. In order to prevent a too high rotor speed of the wind turbine from making the wind turbine unsafe, the setting of the second speed needs to ensure the safety of the wind turbine. Therefore, a relationship between the first speed and the second speed needs to satisfy 0<first speed<second speed<12 rpm in the present disclosure. In addition, the preset regulation angle needs to be selected according to the control response of the wind turbine. When the first preset detection time is 10 seconds, the preset regulation angle is in a range of greater than or equal to 1 degree and less than or equal to 8 degrees.

Specifically, when the wind turbine faces or faces away from the wind, the rotor speed is controlled to be between the first speed and the second speed by pitching. In the present disclosure, the rotor speed may be directly detected by circumferential bolts and proximity switches installed on the main shaft bearing surfaces of the nacelle of the wind turbine; or a high speed encoder may be installed on the wind turbine to determine the speed of the generator, and the speed of the generator may be divided by the gear ratio of the gearbox so as to indirectly measure the rotor speed. When the speed-controlled pitching scheme is just activated, the wind turbine is in a shutdown state, and the rotor speed at this time is 0, which is less than the first speed, so the pitch angles of the three blades of the wind turbine are reduced by the preset regulation angle respectively on the basis of the original pitch angles. After the interval of the first preset detection time, the rotor speed is detected again. If the detected rotor speed is still less than the first speed, the pitch angles of the three blades of the wind turbine are reduced by the preset regulation angle respectively on the basis of the previous pitch angles. If it is detected that the rotor speed is greater than the second speed, the pitch angles of the three blades of the wind turbine are increased by the preset regulation angle respectively on the previous pitch angles. As long as the flutter of the wind turbine is not suppressed, the above steps are repeated all the time. That is, each time after the interval of the first preset detection time, the rotor speed is detected, and then the pitch angles of the three blades are increased or reduced by one preset regulation angle respectively according to the rotor speed. This can prevent the rotor speed from keeping increasing or decreasing, so that the rotor speed can fluctuate within a proper range. Since the blade azimuth changes constantly, there is no condition for the flutter accumulation of the blade, and under the damping action, the blade flutter disappears. During the speed control process, when it is detected that the flutter of the wind turbine is suppressed, the speed-controlled pitching scheme is stopped, and then the pitch angles of the three blades are controlled to recover to a feathered position, which means that the pitch angles stay between 80 degrees and 95 degrees. The first preset detection time is usually 5 seconds to 30 seconds.

In some implementations, the performing the pitching operation on the blades of the wind turbine according to the pitch angle sequence in the preset pitching rules includes: pitching the three blades of the wind turbine to first sequence values in the pitch angle sequence; detecting whether the flutter of the wind turbine is suppressed at an interval of a second preset detection time; in response to the flutter of the wind turbine being not suppressed at the interval of the second preset detection time, performing the pitching operation on the three blades of the wind turbine in accordance with the preset pitching rules such that the pitch angles reach second sequence values in the pitch angle sequence; detecting, after the pitching operation, whether the flutter of the wind turbine is suppressed again at the interval of the second preset detection time; and in response to, after the pitching operation, the flutter of the wind turbine being not suppressed at the interval of the second preset detection time, continuing performing the pitching operation on the three blades of the wind turbine in accordance with the preset pitching rules such that the pitch angles reach next sequence values in the pitch angle sequence. The pitching operation and the action of detecting whether the flutter of the wind turbine is suppressed are repeated until the pitch angles reach the last sequence values in the pitch angle sequence. Then, according to whether the flutter is suppressed or not, the pitching operation is performed on the three blades of the wind turbine in accordance with the preset pitching rules such that the pitch angles recover to the feathered position or reach the first sequence values of the pitch angle sequence, and the above operations are repeated.

The preset pitching rules include: the pitch angles of the three blades in the pitch angle sequence respectively increase or decrease in sequence, a difference between a maximum pitch angle and a minimum pitch angle of the same blade in the pitch angle sequence is greater than a maximum flutter-accumulating pitch angle interval span, and an absolute value of a difference between the adjacent sequence values of the pitch angles of the same blade in the pitch angle sequence is less than a minimum distance between flutter-accumulating pitch angle intervals.

Figure 5:
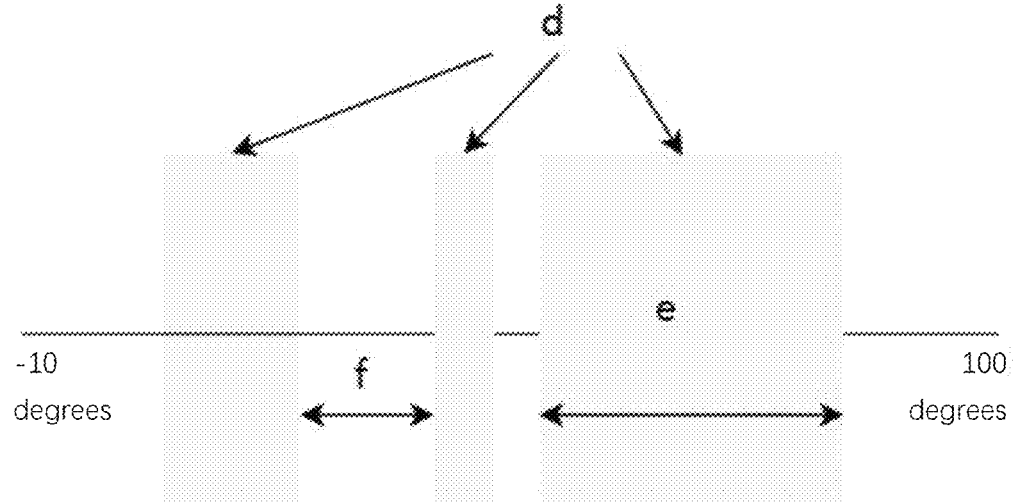
FIG. 5 shows a schematic diagram of flutter-accumulating intervals according to an embodiment of the present disclosure.

Specifically, as shown in FIG. 5, the flutter-accumulating pitch angle interval span and the distance between adjacent flutter-accumulating pitch angle intervals are described as follows:

In the present disclosure, simulation research is carried out by using calculation software capable of fluid-structure interaction simulation, and the flutter accumulation of one blade is investigated at different nacelle-wind direction angles, blade azimuths and pitch angles. The results show that for any nacelle-wind direction angle and blade azimuth, there are some pitch angle intervals that generate flutter accumulation, and the other intervals are non-risky intervals (i.e., intervals that do not generate flutter accumulation). In the prior art, some will reduce the flutter accumulation by determining an optimal pitch angle, but this approach requires a known blade azimuth, which is complicated. In the present disclosure, it is not required to determine the optimal pitch angle, and it is only required to keep the pitch angle outside the flutter-accumulating pitch angle intervals, i.e., it is only required to keep the pitch angle in the non-risky intervals. As shown in FIG. 5, in the whole working interval of the pitch angle, there may be more than one continuous interval that is flutter-accumulating. According to the analysis, the flutter-accumulating pitch angle interval span and the distance between adjacent flutter-accumulating pitch angle intervals may be obtained according to all the flutter-accumulating pitch angle intervals. In FIG. 5, the interval span e shown by the gray area is the flutter-accumulating pitch angle interval span, and the distance f between two flutter-accumulating pitch angle intervals d is the distance between the adjacent flutter-accumulating pitch angle intervals. −10 degrees to 100 degrees is the whole working interval of the pitch angle.

Further, if the difference between the maximum and the minimum in the pitch angle sequence is greater than the maximum flutter-accumulating pitch angle interval and the step of each change of the sequence is less than the minimum distance between flutter-accumulating intervals, there must be at least one pitch angle in the pitch angle sequence that falls in the non-risky interval such that the flutter accumulation of blades will not occur to the wind turbine. It should be noted that since the rotor does not rotate, the risk of each pitch angle will not change during the pitch angle regulation process, so the above scheme is feasible.

Specifically, as shown in FIG. 6, the performing the pitching operation on the blades of the wind turbine according to the pitch angle sequence in the preset pitching rules specifically includes:

In step S10, the three blades of the wind turbine are pitched to initial values (p11,p12,p13) in the pitch angle sequence, and then step S20 is performed, i.e., it is detected whether the flutter of the wind turbine is suppressed at an interval of a second preset detection time. If the flutter of the wind turbine is suppressed, then step S30 is performed, i.e., the three blades of the wind turbine are controlled to recover to the feathered position. If the flutter of the wind turbine is not suppressed, then step S40 is performed, i.e., the pitching operation is performed on the three blades of the wind turbine in accordance with the preset pitching rules such that the pitch angles after pitching are (pi1,pi2,pi3). Then, step S20 and step S40 are repeated until the process proceeds to step S30 or step S50. If the process proceeds to step S50, i.e., the blades are pitched to pitch angles (pn1,pn2,pn3), then step S60 is performed, i.e., it is detected whether the flutter of the wind turbine is suppressed at the interval of the second preset detection time. If so, step S30 is performed, i.e., the three blades of the wind turbine are controlled to recover to the feathered position; and if not, the process returns to step S10.

The maximum flutter-accumulating pitch angle interval span is defined as px; and the minimum distance between adjacent flutter-accumulating pitch angle intervals is defined as py.

According to the specific implementation process shown in FIG. 6, if the pitch angle sequence {pi1.pi2.pi3 (i=1. 2 . . . n)} can satisfy all the following preset pitching rules, the flutter of the wind turbine can be effectively suppressed:

Rule 1

$$p11 > p21 > p31 > \ldots > pn1 \text{ or } p11 < p21 < p31 < \ldots < pn1$$

$$p12 > p22 > p32 > \ldots > pn2 \text{ or } p12 < p22 < p32 < \ldots < pn2$$

$$p13 > p23 > p33 > \ldots > pn3 \text{ or } p13 < p23 < p33 < \ldots < pn3$$

Rule 2

$$\mathrm{Max}\{p11, p21, \ldots, pn1\} - \mathrm{Min}\{p11, p21, \ldots, pn1\} > px$$

$$\mathrm{Max}\{p12, p22, \ldots, pn2\} - \mathrm{Min}\{p12, p22, \ldots, pn2\} > px$$

$$\mathrm{Max}\{p13, p23, \ldots, pn3\} - \mathrm{Min}\{p13, p23, \ldots, pn3\} > px$$

Rule 3

$$\mathrm{Max}\{\mathrm{abs}(p11 - p21), \mathrm{abs}(p21 - p31), \ldots \mathrm{abs}(p(n-1)1 - pn1)\} < py$$

$$\mathrm{Max}\{\mathrm{abs}(p12 - p22), \mathrm{abs}(p22 - p32), \ldots \mathrm{abs}(p(n-1)2 - pn2)\} < py$$

$$\mathrm{Max}\{\mathrm{abs}(p13 - p23), \mathrm{abs}(p23 - p33), \ldots \mathrm{abs}(p(n-1)3 - pn3)\} < py.$$

The maximum flutter-accumulating pitch angle interval span px is usually greater than 60 degrees; and the minimum distance between flutter-accumulating pitch angle intervals py is usually less than 35 degrees.

Further, in the present disclosure, the detecting whether the flutter of the wind turbine is suppressed includes: collecting a vibration signal of a tower vibration sensor or a blade vibration sensor, and determining whether an amplitude of the signal spectrum of the vibration signal in a band of 0.2 Hz to 3.0 Hz is greater than the preset value; if the amplitude is not greater than the preset value, determining that the flutter of the wind turbine is suppressed; and if the amplitude is greater than the preset value, determining that the flutter of the wind turbine is not suppressed. The preset value is in a range of 0.004 m/s^2<preset value<0.1 m/s^2.

The solution of the present disclosure will be further described according to one specific implementation:

In this specific implementation, the wind turbine is a long-blade wind turbine, the nacelle of the wind turbine is provided with a vibration sensor, and a small diesel generator (20 kW) continuously works to supply power to apparatuses on the wind turbine. Under the action of the power supply, a controller, a pitch drive system and a communication system on the wind turbine run effectively.

In this specific implementation, a wind vane installed at the top of the nacelle can sense the angle between the incident airflow and the central axis of the sensor and convert it into an electrical signal, which is sent to the controller, and the controller can obtain the nacelle-wind direction angle accordingly.

The nacelle of the wind turbine is provided with a vibration sensor, and the vibration sensor collects a vibration signal of the tower and transmits the vibration signal to the controller. The vibration signal reflects the real-time vibration acceleration of a single point in the nacelle. The vibration acceleration is cached for 30 seconds and subjected to Fourier transform every 30 seconds. If it is detected that the maximum amplitude of the signal spectrum in the band of 0.2 Hz to 3.0 Hz is greater than 0.1 m/s^2 after the Fourier transform, then it is determined that there is blade flutter at this time. The method of the present disclosure starts to work. Conversely, if the maximum amplitude of the signal spectrum in the band of 0.2 Hz to 3.0 Hz is not greater than 0.01 m/s^2, it is determined that the flutter of the wind turbine is suppressed.

When the flutter of the wind turbine is detected, the controller reads the nacelle-wind direction angle. In this specific implementation, the first angle is 50 degrees and the second angle is 120 degrees. In this case, if it is detected that the nacelle-wind direction angle is less than 50 degrees or greater than 120 degrees, then the speed-controlled pitching scheme is used. Conversely, if it is detected that the nacelle-wind direction angle is greater than 50 degrees and less than 120 degrees, then the pitch-angle-sequence-controlled pitching scheme is used.

In the speed-controlled pitching scheme, the first speed is 1 rpm, the second speed is 8 rpm, and the preset regulation angle is 6 degrees. In this specific implementation, the rotor speed may be directly detected by a row of bolts and proximity switches installed on the main shaft bearing surfaces of the nacelle of the wind turbine. When the control program is just activated, the wind turbine is in a shutdown state, and the speed is less than 0, which is less than the first speed, so the controller controls the pitch angles to decrease by one preset regulation angle (6 degrees), such that the pitch angles change from 89 degrees (feathered angles) to 83 degrees. Then, after a first preset detection time (in this specific implementation, the first preset detection time is set to 10 seconds), the rotor speed is detected again. If the speed is less than 1 rpm, the controller controls the pitch angles to decrease by 6 degrees. After the rotor speed is greater than 1 rpm, the pitch angles will be stable. After that, if the wind speed increases, it may cause a rapid rise in speed. If it is detected that the speed is greater than 8 rpm (second speed), the controller controls the pitch angles to increase so as to avoid an overhigh speed. Then, after 10 seconds, the rotor speed is detected again. In the speed control, when a vibration signal processing program detects that the flutter of the wind turbine is suppressed, the speed-controlled pitching scheme is stopped, and the controller controls the three pitch angles to recover to the feathered position (which is 89 degrees in this specific implementation).

The pitch-angle-sequence-controlled pitching scheme will be described in the implementation following:

In the pitch-angle-sequence-controlled pitching scheme, simulation research for a specific model shows that the maximum flutter-accumulating interval span is 47 degrees, and the minimum distance between intervals is 16 degrees. The pitch angle sequence selected in this scheme is as follows:

$$\{(pi1, pi2, pi3) \mid (i = 1, 2, \ldots n)\} =$$

$$\{(89, 89, 10), (76, 76, 23), (62, 62, 36), (48, 48, 49), (34, 34, 72)\}.$$

As can be seen, n=5, and the three preset rules mentioned in the method of the present disclosure are respectively verified as follows:

$$p11 > p21 > p31 > p41 > p51 \hspace{2cm} \text{Rule 1}$$

$$p12 > p22 > p32 > p42 > p52$$

$$p13 < p23 < p33 < p43 < p53$$

The above pitch angle sequence conforms to Rule 1.

$$\text{Rule 2}$$

$$\text{Max}\{p11, p21, p31, p41, p51\} - \text{Min}\{p11, p21, p31, p41, p51\} = 55 > 47$$

$$\text{Max}\{p12, p22, p32, p42, p52\} - \text{Min}\{p12, p22, p32, p42, p52\} = 55 > 47$$

$$\text{Max}\{p13, p23, p33, p43, p53\} - \text{Min}\{p13, p23, p33, p43, p53\} = 62 > 47$$

As can be seen, the above pitch angle sequence also conforms to Rule 2.

$$\text{Rule 3}$$

$$\max\{\text{abs}(p11 - p21), \text{abs}(p21 - p31), \text{abs}(p31 - p41), \text{abs}(p41 - p51)\} =$$

$$14 < 16$$

$$\max\{\text{abs}(p12 - p22), \text{abs}(p22 - p32), \text{abs}(p32 - p42), \text{abs}(p42 - p52)\} =$$

$$14 < 16$$

$$\max\{\text{abs}(p13 - p23), \text{abs}(p23 - p33), \text{abs}(p33 - p43), \text{abs}(p43 - p53)\} =$$

$$13 < 16$$

As can be seen, the above pitch angle sequence also conforms to Rule 3.

As a result, the control of the above sequence is effective. During the specific implementation, if it is detected that there is flutter of the wind turbine and the nacelle-wind direction angle is between 50 degrees and 120 degrees, then the pitch angles of the three blades are first regulated to (89,89,10). After 5 minutes (the second preset detection time is 5 minutes in this specific implementation), if there is still flutter, the pitch angles are further regulated to (76,76,23), which is repeated until the pitch angles reach (34,34,72). According to the design principle, in the above pitching process, there must be such a pitch angle combination that can make the flutter suppressed during the interval of the second preset detection time. After the flutter is suppressed, the pitch angles are controlled to recover to the feathered position (89,89,89).

Further, if the wind direction changes suddenly during the pitch angle regulation process, the flutter-accumulating pitch angle intervals may change. In this case of a low probability, if the controller detects that there is still blade flutter more than 5 minutes after the pitch angles are regulated to (34,34,72), the pitch angles are regulated to the first sequence values (89,89,10), and the above process is repeated until the flutter is suppressed. Then, the blades are pitched to the feathered position (89,89,89).

According to the present disclosure, first, the nacelle-wind direction angle between the wind direction and the nacelle direction is determined; and then whether the pitching operation is performed by using the speed-controlled pitching scheme or the pitch-angle-sequence-controlled pitching scheme according to the nacelle-wind direction angle. With this method, the flutter suppression of the wind turbine can be realized without yawing when the wind turbine is powered down. Moreover, with the method of the present disclosure, in the case of an unknown blade azimuth, whether the flutter is suppressed can be detected only based on the vibration signal collected by the tower vibration sensor or the blade vibration sensor. Therefore, the pitch angles that can effectively suppress flutter are found by combining the speed-controlled pitching scheme that destroys the flutter accumulation condition with the pitch-angle-sequence-controlled pitching scheme.

FIG. 7 shows a schematic structural diagram of a wind turbine flutter suppression device according to an embodiment of the present disclosure. Exemplarily, the wind turbine flutter suppression device includes:

a calculation module 10, configured to determine a nacelle-wind direction angle between a nacelle direction of a wind turbine and a wind direction; and a determination module 20, configured to determine a pitching policy for changing pitch angles according to the nacelle-wind direction angle.

The pitching policy is selected from a plurality of pitching policies including a speed-controlled pitching scheme and a pitch-angle-sequence-controlled pitching scheme.

The speed-controlled pitching scheme includes regulating pitch angles of blades of the wind turbine according to a rotor speed of the wind turbine to keep the rotor speed within a preset speed range until flutter of the wind turbine is suppressed.

The pitch-angle-sequence-controlled pitching scheme includes performing a pitching operation on the blades of the wind turbine according to a pitch angle sequence in preset pitching rules until the flutter of the wind turbine is suppressed.

It can be understood that the device of this embodiment corresponds to the wind turbine flutter suppression method of the above embodiment, and the options in the above embodiment are also applicable to this embodiment, so the description will not be repeated here.

The present disclosure further provides a control system for a wind turbine, including a controller and a pitch drive system. The pitch drive system is configured to receive an instruction of the controller and pitch blades of the wind turbine. The controller is configured to perform a wind turbine flutter suppression method as described above and output a control instruction to the pitch drive system.

The present disclosure further provides a wind turbine, including a control system for a wind turbine as described above.

In the embodiments provided by the present disclosure, it should be understood that the disclosed device and method may also be implemented in other manners. The above device embodiments are merely illustrative, for example, the flowcharts and structural diagrams in the accompanying drawings illustrate the architecture, functionality and operation of possible implementations of devices, methods and computer program products according to the embodiments of the present disclosure. In this regard, each block of the flowchart or block diagram may represent a module, a program segment, or a portion of a code that includes one or more executable instructions for implementing the specified logical functions. It should also be noted that in alternative implementations, the functions noted in the blocks may also occur in a different order from the one illustrated in the accompanying drawings. For example, two consecutive blocks may be executed substantially in parallel, and they may sometimes be executed in the reverse order, depending upon the function involved. It should also be noted that each block of the structural diagram and/or flowchart, and a combination of blocks in the structural diagram and/or flowchart, may be implemented in a special hardware-based system that performs the specified function or action, or may be implemented by a combination of special hardware and computer instructions.

In addition, the functional modules or units in the embodiments of the present disclosure may be integrated to form a separate part, or each module may exist separately, or two or more modules may be integrated to form a separate part.

When the function is implemented in the form of a software function module or sold or used as a separate product, the software function module may be stored in a computer-readable storage medium. Based on such an understanding, the technical solution of the present disclosure essentially or for the part that contributes to the prior art or all or part of the technical solution can be embodied in the form of a software product, and the computer software product is stored in a storage medium and includes several instructions used for enabling a computer apparatus (which may be a smartphone, a personal computer, a server, a network apparatus or the like) to execute all or part of the steps of the methods of the embodiments of the present disclosure. The foregoing storage medium includes: a USB flash disk, a mobile hard disk, a read-only memory (ROM), a random access memory (RAM), a magnetic disk, an optical disk, or any medium that can store program codes.

The foregoing descriptions are merely specific implementations of the present disclosure, but the protection scope of the present disclosure is not limited thereto. Any variation or replacement readily figured out by those skilled in the art within the technical scope disclosed in the present disclosure shall fall within the protection scope of the present disclosure.

What is claimed is:

1. A wind turbine flutter suppression method, comprising:

determining a nacelle-wind direction angle between a nacelle direction of a wind turbine and a wind direction; and determining a pitching policy for changing pitch angles of blades of the wind turbine according to the nacelle-wind direction angle; wherein the pitching policy comprises a speed-controlled pitching scheme and a pitch-angle-sequence-controlled pitching scheme;

wherein the speed-controlled pitching scheme comprises:
regulating the pitch angles of blades of the wind turbine according to a rotor speed of the wind turbine to keep the rotor speed within a preset speed range until flutter of the wind turbine is suppressed; and the pitch-angle-sequence-controlled pitching scheme comprises: performing a pitching operation on the blades of the wind turbine according to a pitch angle sequence in preset pitching rules until the flutter of the wind turbine is suppressed.

2. The wind turbine flutter suppression method according to claim 1, wherein the determining the pitching policy for changing the pitch angles according to the nacelle-wind direction angle comprises:

using the speed-controlled pitching scheme to change the pitch angles when the nacelle-wind direction angle is less than a first angle or the nacelle-wind direction angle is greater than or equal to a second angle; and using the pitch-angle-sequence-controlled pitching scheme to change the pitch angles when the nacelle-wind direction angle is greater than or equal to the first angle and less than the second angle;

wherein the first angle is in a range of greater than or equal to 40 degrees and less than or equal to 70 degrees; and the second angle is in a range of greater than or equal to 110 degrees and less than or equal to 140 degrees.

3. The wind turbine flutter suppression method according to claim 2, wherein the regulating the pitch angles of the blades of the wind turbine according to the rotor speed of the wind turbine to keep the rotor speed within the preset speed range comprises:

detecting, each time after regulating the pitch angles of the blades of the wind turbine, whether the rotor speed is within the preset speed range at an interval of a first preset detection time;

wherein the preset speed range is between a first speed and a second speed;

reducing, in response to detecting that the rotor speed is less than the first speed, the pitch angles of the blades of the wind turbine by a preset regulation angle respectively; and increasing, in response to detecting that the rotor speed is greater than the second speed, the pitch angles of the blades of the wind turbine by the preset regulation angle respectively;

wherein 0<first speed<second speed<12 rpm.

4. The wind turbine flutter suppression method according to claim 2, wherein the performing the pitching operation on the blades of the wind turbine according to the pitch angle sequence in the preset pitching rules comprises:

pitching the blades of the wind turbine to first sequence values in the pitch angle sequence;

detecting whether the flutter of the wind turbine is suppressed at a first interval of a second preset detection time;

in response to detecting that the flutter of the wind turbine is not suppressed at the first interval of the second preset detection time, pitching the blades of the wind turbine in accordance with the preset pitching rules such that the pitch angles reach second sequence values in the pitch angle sequence;

detecting, whether the flutter of the wind turbine is suppressed again at a second interval of the second preset detection time; and in response to detecting that the flutter of the wind turbine is still not suppressed at the second interval of the second preset detection time, pitching the blades of the wind turbine in accordance with the preset pitching rules such that the pitch angles reach next sequence values in the pitch angle sequence;

wherein the preset pitching rules comprise:

the pitch angles of the blades in the pitch angle sequence respectively increase or decrease in sequence;

a difference between a maximum pitch angle and a minimum pitch angle of the same blade in the pitch angle sequence is greater than a maximum flutter-accumulating pitch angle interval span; and an absolute value of a difference between the adjacent sequence values of the pitch angles of the same blade in the pitch angle sequence is less than a minimum distance between flutter-accumulating pitch angle intervals.

5. The wind turbine flutter suppression method according to claim 4, wherein the maximum flutter-accumulating pitch angle interval span is greater than 60 degrees; and the minimum distance between flutter-accumulating pitch angle intervals is less than 35 degrees.

6. The wind turbine flutter suppression method according to claim 4, wherein the detecting whether the flutter of the wind turbine is suppressed comprises:

collecting a vibration signal of a tower vibration sensor or a blade vibration sensor on the wind turbine; performing spectrum analysis on the vibration signal, and extracting an amplitude-frequency component of the vibration signal in a band of 0.2 Hz to 3.0 Hz as an equivalent amplitude; and determining whether the flutter of the wind turbine is suppressed based on whether the equivalent amplitude is not greater than a preset value, wherein the preset value is in a range of 0.004 m/s^2<preset value<0.1 m/s^2.

7. The wind turbine flutter suppression method according to claim 1, wherein after the flutter of the wind turbine is suppressed, the method further comprises:

controlling the blades of the wind turbine to recover to a feathered position;

wherein the feathered position corresponds to a position where the pitch angles are greater than or equal to 80 degrees and less than or equal to 95 degrees.

8. The wind turbine flutter suppression method according to claim 2, wherein after the flutter of the wind turbine is suppressed, the method further comprises:

controlling the blades of the wind turbine to recover to a feathered position;

wherein the feathered position corresponds to a position where the pitch angles are greater than or equal to 80 degrees and less than or equal to 95 degrees.

9. The wind turbine flutter suppression method according to claim 3, wherein after the flutter of the wind turbine is suppressed, the method further comprises:

controlling the blades of the wind turbine to recover to a feathered position;

wherein the feathered position corresponds to a position where the pitch angles are greater than or equal to 80 degrees and less than or equal to 95 degrees.

10. The wind turbine flutter suppression method according to claim 4, wherein after the flutter of the wind turbine is suppressed, the method further comprises:

controlling the blades of the wind turbine to recover to a feathered position;

wherein the feathered position corresponds to a position where the pitch angles are greater than or equal to 80 degrees and less than or equal to 95 degrees.

11. The wind turbine flutter suppression method according to claim 5, wherein after the flutter of the wind turbine is suppressed, the method further comprises:

controlling the blades of the wind turbine to recover to a feathered position;

wherein the feathered position corresponds to a position where the pitch angles are greater than or equal to 80 degrees and less than or equal to 95 degrees.

12. The wind turbine flutter suppression method according to claim 6, wherein after the flutter of the wind turbine is suppressed, the method further comprises:

controlling the blades of the wind turbine to recover to a feathered position;

wherein the feathered position corresponds to a position where the pitch angles are greater than or equal to 80 degrees and less than or equal to 95 degrees.

13. A control system for a wind turbine, comprising a controller and a pitch drive system; wherein the pitch drive system is configured to pitch blades of the wind turbine under control of the controller; and the controller is configured to:

determine a nacelle-wind direction angle between a nacelle direction of a wind turbine and a wind direction;

in response to the nacelle-wind direction angle being less than a first angle or greater than or equal to a second angle, control the pitch drive system to regulate pitch angles of blades of the wind turbine according to a rotor speed of the wind turbine to keep the rotor speed within a preset speed range until flutter of the wind turbine is suppressed; and in response to the nacelle-wind direction angle being greater than or equal to the first angle and less than the second angle, control the pitch drive system to perform a pitching operation on the blades of the wind turbine according to a pitch angle sequence in preset pitching rules until the flutter of the wind turbine is suppressed.

14. A wind turbine, comprising a control system for a wind turbine according to claim 13.

\* \* \* \* \*